United States Patent
Romano

(10) Patent No.: US 9,477,752 B1
(45) Date of Patent: Oct. 25, 2016

(54) ONTOLOGY ADMINISTRATION AND APPLICATION TO ENHANCE COMMUNICATION DATA ANALYTICS

(71) Applicant: Verint Systems Ltd., Herzilya Pituach (IL)

(72) Inventor: Roni Romano, Even Yehuda (IL)

(73) Assignee: VERINT SYSTEMS INC., Melville, NY (US)

( * ) Notice: Subject to any disclaimer, the term of this patent is extended or adjusted under 35 U.S.C. 154(b) by 64 days.

(21) Appl. No.: 14/501,480

(22) Filed: Sep. 30, 2014

Related U.S. Application Data

(60) Provisional application No. 61/884,559, filed on Sep. 30, 2013, provisional application No. 61/884,577, filed on Sep. 30, 2013.

(51) Int. Cl.
| | |
|---|---|
| G06F 17/27 | (2006.01) |
| G10L 15/00 | (2013.01) |
| G10L 17/00 | (2013.01) |
| G06F 17/30 | (2006.01) |
| G06F 17/28 | (2006.01) |

(52) U.S. Cl.
CPC ......... G06F 17/30734 (2013.01); G06F 17/28 (2013.01)

(58) Field of Classification Search
None
See application file for complete search history.

(56) References Cited

U.S. PATENT DOCUMENTS

| 5,317,673 A * | 5/1994 | Cohen | G10L 15/144 704/232 |
|---|---|---|---|
| 7,552,053 B2 * | 6/2009 | Gao | G10L 15/26 704/258 |
| 7,734,467 B2 * | 6/2010 | Gao | G10L 15/26 704/258 |
| 7,844,459 B2 * | 11/2010 | Budde | G10L 15/063 704/231 |
| 8,036,876 B2 * | 10/2011 | Sanfilippo | G06F 17/2785 704/10 |
| 8,260,809 B2 * | 9/2012 | Platt | G06F 17/276 707/771 |
| 8,285,552 B2 * | 10/2012 | Wang | G10L 13/00 704/231 |
| 8,447,604 B1 * | 5/2013 | Chang | H04N 9/475 434/185 |
| 8,825,488 B2 * | 9/2014 | Scoggins, II | H04N 9/475 704/235 |
| 8,825,489 B2 * | 9/2014 | Scoggins, II | H04N 9/475 704/235 |
| 8,874,432 B2 * | 10/2014 | Qi | G06F 17/271 704/9 |
| 9,066,049 B2 * | 6/2015 | Scoggins, II | H04N 9/475 |
| 2009/0326947 A1 * | 12/2009 | Arnold | G10L 15/26 704/257 |
| 2012/0303356 A1 * | 11/2012 | Boyle | G06F 17/30672 704/9 |
| 2013/0166303 A1 * | 6/2013 | Chang | G06F 17/30787 704/258 |
| 2016/0055848 A1 * | 2/2016 | Meruva | G10L 15/22 704/275 |

* cited by examiner

*Primary Examiner* — Satwant Singh
(74) *Attorney, Agent, or Firm* — Meunier Carlin & Curfman

(57) ABSTRACT

A method for developing an ontology for practicing communication data, wherein the ontology is a structural representation of language elements and the relationship between those language elements within the domain, includes providing a training set of communication data and processing the training set of communication data to identify terms within the training set of communication data, wherein a term is a word or short phrase. The method further includes utilizing the terms to identify relations within the training set of communication data, wherein a relation is a pair of terms that appear in proximity to one another. Finally, the terms in the relations are stored in a database.

13 Claims, 8 Drawing Sheets

ONTOLOGY ADMINISTRATION AND APPLICATION TO ENHANCE COMMUNICATION DATA ANALYTICS

CROSS-REFERENCE TO RELATED APPLICATION

The present application is based on and claims priority to U.S. Provisional Patent Application Ser. No. 61/884,559, filed Sep. 30, 2013 and U.S. Provisional Patent Application Ser. No. 61/884,577, filed Sep. 30, 2013, the disclosures of which are incorporated herein by reference.

BACKGROUND

The present disclosure relates to the field of automated data processing, and more specifically to the application of ontology programming to process and analyze communication data. In the realms of computer and software sciences and information science, an ontology is a structural framework for organizing information regarding knowledge and linguistics within a domain. The ontology represents knowledge within a domain as a hierarchical set of concepts, and the relationships between those concepts, using a shared vocabulary to denote the types, properties, and interrelationship of those concepts. For example, the ontology models the specific meanings of terms as they apply to that domain.

SUMMARY

A method for developing an ontology for practicing communication data, wherein the ontology is a structural representation of language elements and the relationship between those language elements within the domain, includes providing a training set of communication data and processing the training set of communication data to identify terms within the training set of communication data, wherein a term is a word or short phrase. The method further includes utilizing the terms to identify relations within the training set of communication data, wherein a relation is a pair of terms that appear in proximity to one another. Finally, the terms in the relations are stored in a database.

Another embodiment of a method for developing an ontology for processing communication data includes creating an initial ontology by providing a training set of communication data and processing the training set of communication data to identify terms within the set of communication data, wherein a term is a word or short phrase. Creating an initial ontology further includes utilizing the terms to identify relations within a training set of communication data, wherein a relation is a pair of terms that appear in proximity to one another, and storing the terms and the relations in a database. The method further includes providing the initial ontology to a user for review and receiving feedback from the user to refine the initial ontology to create a refined ontology, and storing the refined ontology.

Another embodiment of a method for processing communication data includes creating an ontology based on a training set of communication data, wherein the ontology is a structural representation of language elements and the relationships between those language elements within a domain. The method further includes receiving feedback to refine the initial ontology to create a refined ontology. A set of communication data is then loaded and processed based on the refined ontology to identify terms and relations if in the set of communication data. The communication data is then analyzed to determine performance data.

DETAILED DESCRIPTION OF THE DRAWINGS

Figure 1:
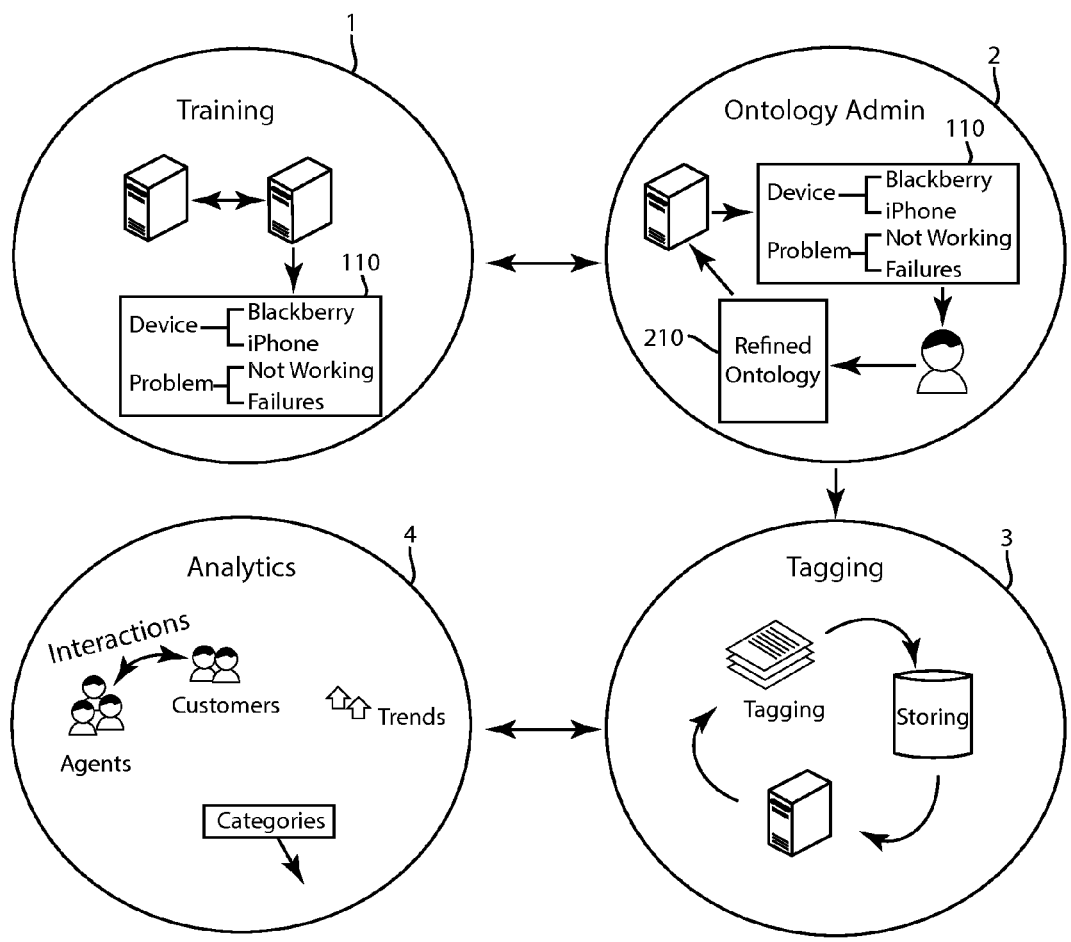
FIG. 1 depicts an exemplary embodiment of the ontology process and programming disclosed herein.

According to the present invention, an ontology may be developed and applied across all types of communication data, for example, all types of customer interactions (which may include interactions in multiple languages) as a tool for processing and interpreting such data. The communication data may document or relate to any type of communication, including communications made via phone, via email, via internet chat, via text messaging, etc. For example, communication data may contain any spoken content or any written correspondence or communication, including but not limited to live speech, audio recording, streaming audio, transcribed textual transcripts, or documents containing written communications, such as manuscripts, web pages, email, physical mail, text messages, chats, etc. In the exemplary context of a customer service application, the communication data may be between a customer service agent or an automated system, such as an interactive voice response (IVR) recording, and a customer or caller. While the present disclosure is often exemplified herein by describing an embodiment involving the analysis of audio data, such as recorded audio transcripts, it is to be understood that in alternative embodiments other forms of oral or written communications may be used or analyzed. A particular ontology may be defined for and applied to any domain, and other examples include financial services, consumer products, subscription services, or some other business application involving communication data interactions.

In the generation or development of an ontology, repeating patterns are identified and ranked based upon statistical significances and then clustered into terms and term relationships. The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the business environment by processing and analyzing a corpus of communication data.

The disclosed ontology programming, once built and refined for a specific business application, is applied to process communication data to provide valuable analytics for a variety of business needs. For example, the ontology programming can then be utilized to detect and surface meaningful items in a data set, such as a database of recorded employee-customer interactions, and can mine the data set to extract and analyze business data based on an enhanced formulization of a company's internal knowledge and terminology.

An exemplary embodiment of the presently disclosed ontology solution incorporates four main stages. As seen in FIG. 1, the four main stages include training 1, ontology administration 2, ontology tagging 3, and ontology analytics 4. The training step 1 involves internal machine learning in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology. A detailed analysis of each stage is addressed in turn.

In the training phase 1, communication data is transformed into a usable format and then use to generate an ontology. For example, audio data from one or more customer interactions between a customer service agent/IVR and a customer/caller can be automatically transcribed into a textual file through speech recognition techniques, and the textual file can be processed as described herein to generate an ontology.

Generally, an ontology as disclosed herein includes terms which are individual words or short phrases that represent the basic units or concepts that might come up in the communication data. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. In a preferred embodiment, all words in the corpus, or set of communication data, can only be associated with one term, and each term can only be counted once.

Development of an ontology involves the identification of term candidates. A set of communication data used for training purposes is divided into potential terms, or term candidates. Terms are then selected from those term candidates. Strong term candidates contain words or word sets that are compact and, in the instance of word sets, the frequency of finding the word set together is very high. An example of a term containing a word set is "credit card number," as those words very often appear together and refer to a particular, defined object. In addition, good terms often contain words that make more conceptual sense when they are together, as opposed to being on their own. For example, the term "Nova Scotia" is comprised of words that make sense when found together, and would likely not appear or make sense separately.

The frequency that the words of a particular word set, or term, appear together may be referred to as the "stickiness" of the term. A "sticky" term is one whose words appear frequently appear together in the corpus. The higher the stickiness ranking, the stronger the term, as it means that the term has meaning in the corpus as a concept. Salient terms are those that stand out or have a higher score relative to similar or neighboring terms. Non-salient terms and less-salient terms are those that appear many times or a relatively large number of times in many different contexts. The score of such non-salient or less-salient terms is lowered as compared to the score for salient terms. The logic is that salient terms are likely to be meaningful as a concept, whereas non-salient terms are not likely to express a particular concept. For example, the score of the term "account number" would be higher than the score of the term "the account number" because the word "the" appears in many different contexts and also by itself. Therefore, the word "the" does not add any significant meaning when joined with the term "account number."

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may include "objects", "actions", "modifiers", "documents", "service", "customers", or "locations". However, these are not intended to be limiting on the types of classes, particularly the types of classes that may appear in an ontology directed to a specific or specialized domain.

Figure 2:
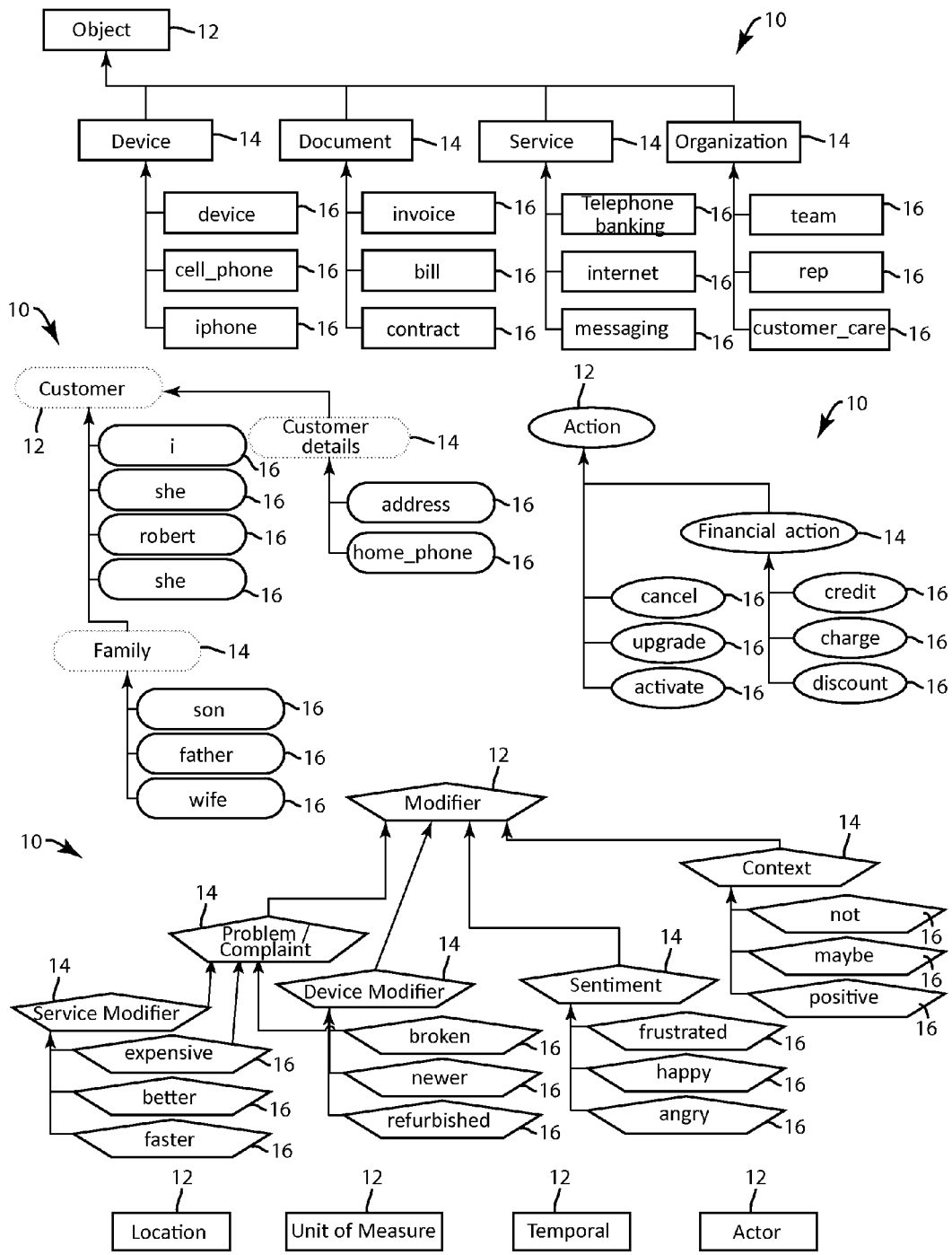
FIG. 2 depicts examples of hierarchical presentations of ontologies developed according to the disclosed process.

The classes, subclasses, and terms are connected by a plurality of relations. Relations are defined relationships between terms, terms and classes, terms and subclasses, and/or subclasses and classes. Furthermore, relations 308 may be linkages or relationships between the defined terms in the corpus. For example, the term "pay" may be related to the term "bill" to form the relation "pay>bill." In another non-limiting example, the term "pay" may be defined under the class "action" and the term "bill" may be defined in the class "documents". Still further binary directed relationships can be defined between these class/term pairs. For example, the action/pay pair may be related to the document/bill pair in that the payment action requires an underlying document, which may be a bill. In another non-limiting example, the term "broken" may be defined in the class "problems" and the term "iPhone" may be defined in the class "device". The problem/broken pair can also have a directed relationship to the "devices" class in which the "iPhone" term is a specific example as represented by the devices/iPhone pair. FIG. 2 depicts exemplary, non-limiting embodiments of a portion an ontology 10, including classes 12, subclasses 14, and terms 16. The arrows between the terms/classes/subclasses represent some relations that may exist in the depicted portion of the exemplary ontology.

Figure 3:
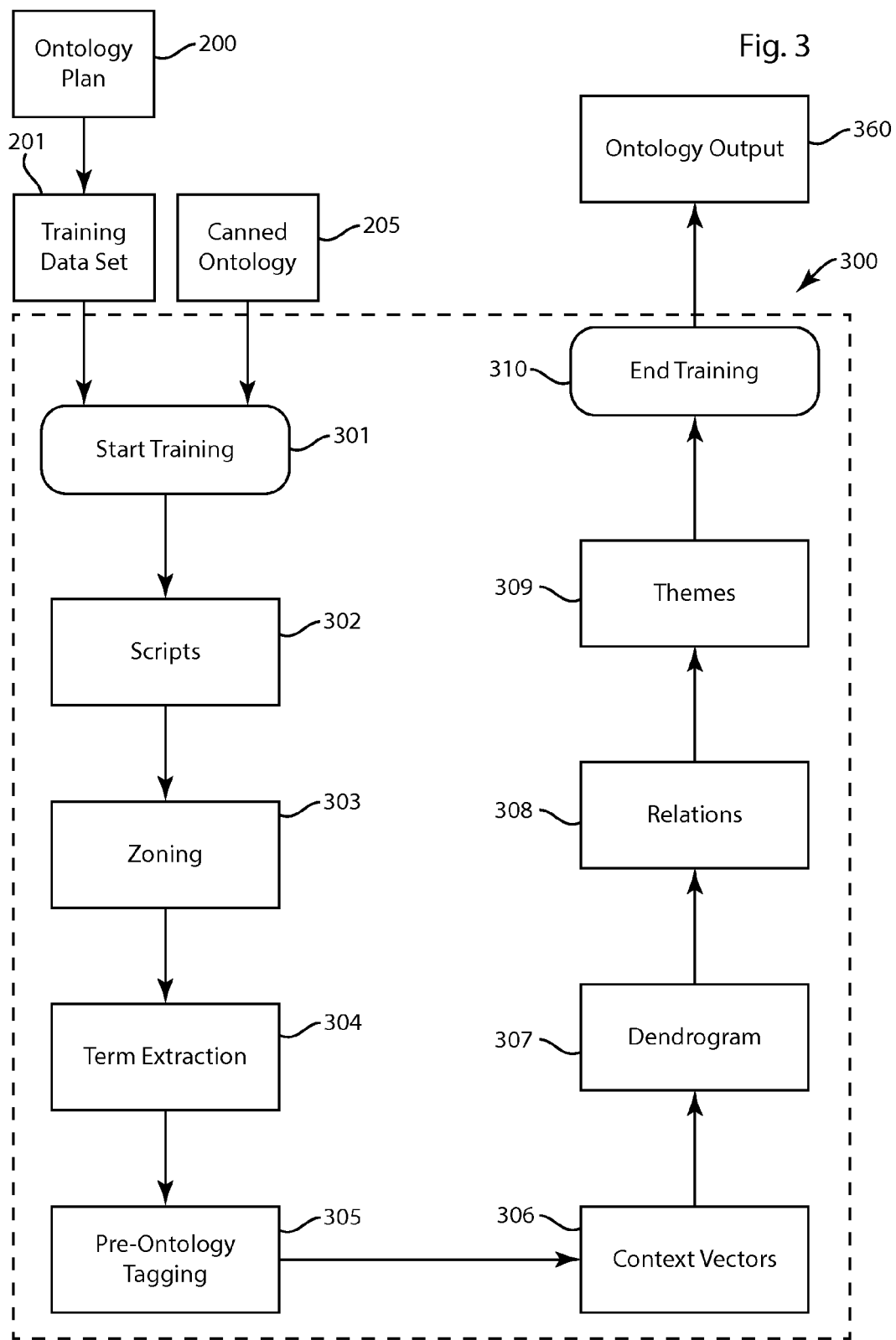
FIG. 3 is a schematic diagram of an embodiment of a process for ontology development.

FIG. 3 represents an overview of an exemplary training phase 1 for developing an initial ontology 110. The initial ontology 110 is built by a step-by-step pipeline process that applies various features to the defined data. These features include the extracting and surfacing of words and phrases in the corpus that helps users make non-trivial observations about a customer-specific domain.

As exemplified in FIG. 3, developing an ontology may begin with the prerequisite steps of developing an ontology plan 200 and training data set 201. Developing an ontology plan 200 may involve assessing a customer's business needs to develop a comprehensive plan for the ontological structure that can process the customer's data to provide the desired result. For example, developing an ontology plan 200 could involve determining how many ontologies are required for a specific customer, and to what data those ontologies should be created from and applied to. For example, customers may decide they need multiple ontologies to handle specialized types of data that can be categorized into different business domains. Separate ontologies may be useful in such a scenario because different business domains may have differing terms, classes, and relations.

Developing the training data set 201 involves accumulating data for each planned ontology that contains a range of communications sufficient to be representative of the language and linguistic structure of that domain. Preferably, the training data set 201 contains various types of data and originates over a sufficiently long time period, for example, between about a month previous to the date of implementing the training step up until the most recent available data at the time of execution of the training. The training data set 201 may include data from a single platform, such as transcriptions of customer service phone calls, or it may include data from multiple platforms, such as customer service calls, emails, web chats, text messages, web page comments, facebook or twitter interactions, customer surveys, etc. In still other embodiments, the sample data set includes other types of business documents such as, but not limited to, white papers, user manuals, service manuals, or catalogs.

Preferably, the ontology training process 1 is not executed until a certain, predefined amount of data is gathered for the training. Further, it may be preferable to utilize all types of data in the training data set 201 to which the resultant ontology will be applied (e.g., see FIG. 7). In one embodiment, a configured scheduler may monitor the data gathering process and count the number of records or amount of data added. When the number of records or amount of data in the training data set 201 reaches that predetermined amount, the scheduler may execute the ontology training process 1. Alternatively or additionally, the scheduler may monitor the types and/or variety of data added to the training data set 201 so as to ensure that the training 301 does not begin until certain types and/or varieties of data are available to the training set.

Additionally, the ontology training process can be assisted by starting with a canned ontology 205. A canned ontology 205 is an ontology that is developed for a particular business application or sector—a unique language model that reflects, or fits, the relevant business application. For example, a canned ontology 205 may be developed for telecommunications applications, and the telecom canned ontology 205 would differ from that developed for insurance industry applications, which would differ from the canned ontology 205 developed for the finance industry, etc. A user, or company, in a particular industry may begin the training process by implementing one or more relevant canned ontologies 205. The canned ontology is then refined during the ontology training and administration phases, 1 and 2 (FIG. 1), to develop a specialized ontology for that particular user. If a user starts the training process by implementing more than one canned ontology 205, the canned ontologies are preferably unified during the ontology training and administration phases, 1 and 2, so that one, unified and encompassing ontology structure is developed for the user.

The canned ontology may be developed in various ways. For example, the canned ontology may be developed by taking data samples generated by multiple different users or classes in a particular industry. Alternatively, a canned ontology may be created by combining multiple ontologies developed using sample data sets from a particular industry. For example, multiple users may develop an ontology for their particular business based on their own internal data. Those individual ontologies may then be combined through a process of comparison, wherein the common elements in the ontologies receive heavier weight than the elements that differ. In still other embodiments, a canned ontology could be developed over a series of training processes where one user develops an ontology based on its data, and then the next user uses the first user's ontology as a canned ontology 205 input to its training process. Thereby, each subsequent user implements a previous user's output ontology as a canned ontology 205 input, and amends or refines that canned ontology 205 through the training process to develop its own ontology.

Figure 4:
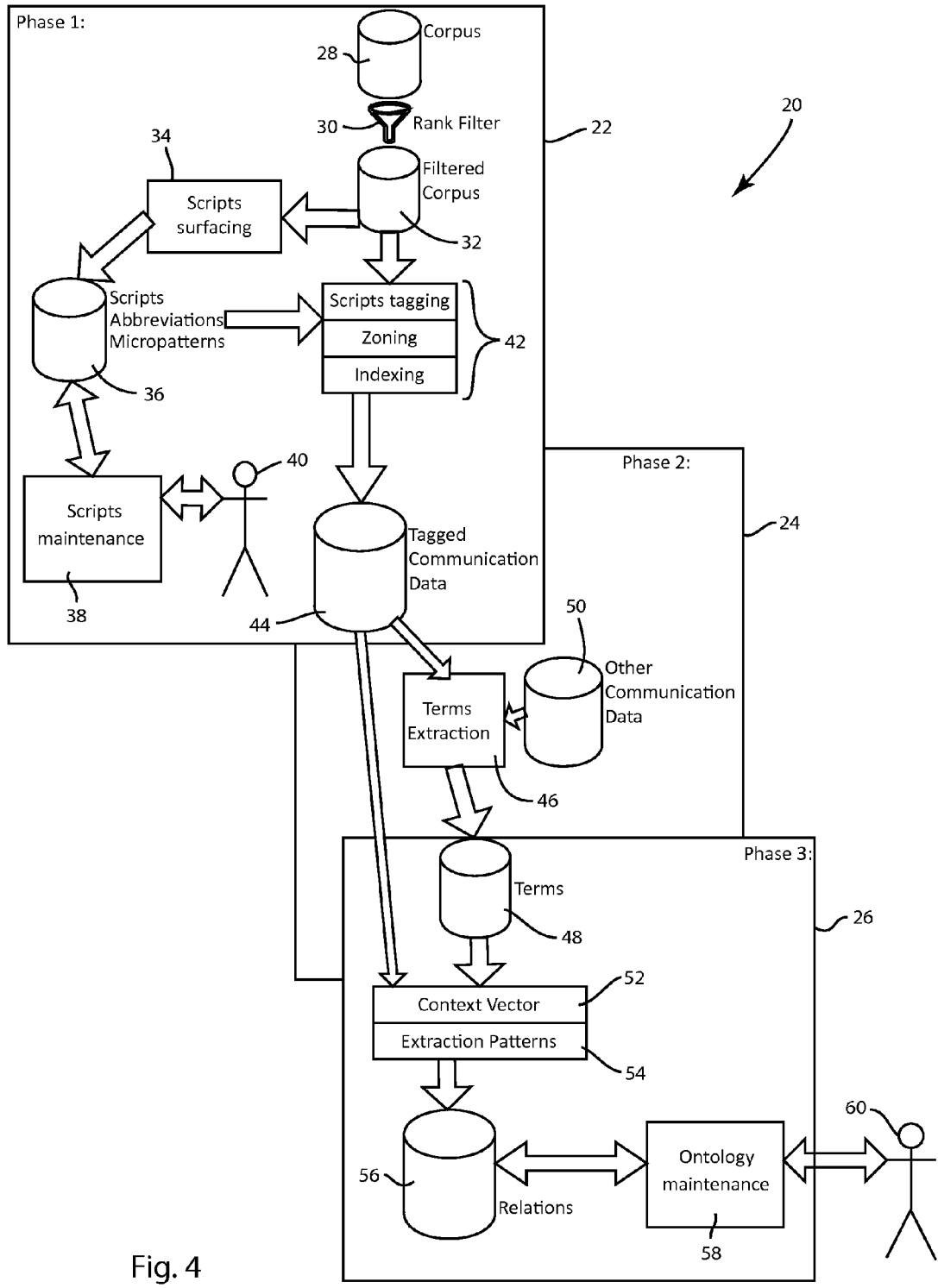
FIG. 4 is another schematic diagram of an embodiment of a process for ontology development.

Once the sample data set 201 is fully developed, and/or the one or more canned ontologies 205 selected, the training phase 1 continues by executing a training module 300, examples of which are depicted in FIGS. 3 and 4. Starting with the embodiment of FIG. 3, at step 301, the sampled data set 201 for each planned ontology 200 and/or canned ontology 205 is fed into the training module 300. The module 300 then identifies scripts 302 within the training data set 201. Scripts 302 are lengthy, repeated patterns that appear in the data set 201. Due to their length and historical frequency, scripts are highly likely to be accurately identified and to have emanated from the same speaker. For example, a standard phrase spoken by a customer service agent, such as "Hello, how can I help you?" may comprise a script. Further, scripts 302 may be identified by matching the data in the training data set 201 with a set of predefined scripts loaded into the system. The predefined scripts may be user defined or user specific, or may be a more generic list of common phrases or statements signifying scripted events.

Following the identification of scripts, the module 300 executes a zoning process 303 that segments conversations within a defined corpus, or data set, into meaning units. Meaning units 68 are sequences of words that express an idea. In the context of spoken or informal communications, the meaning unit 68 may be the equivalent of a sentence. Meaning units divide scripts or utterances into a basic segments of meaning or the equivalent of a sentence, when narrated text is compared to written text. A meaning unit may be a sequence of words spoken by one speaker in a conversation without interference. A non-limiting example of a meaning unit in a customer service context would be the customer statement "I would like to buy a phone." In some embodiments, the meaning unit may include some level of speaker interference, e.g. very short acknowledgement statements by the other speaker. All terms in the meaning unit are linked within the boundaries of the meaning unit.

After the zoning process has been completed for the sample data set 201, the module 300 executes term extraction 304. Term extraction 304 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 300 executes a pre-ontology tagging step 305 that tags all terms in a non-overlapping way. For example, according to the explanation provided later herein, the pre-ontology step 305 may be executed such that a term cannot span two meaning units and two terms can never overlap each other. Similarly, longer terms may be preferred over shorter ones. For example, the term "my phone number" is counted as one term, rather than two—i.e. "my phone" and "my phone number"—and the term embodying three words is selected over the term with two as the term with more words conveys more contextual meaning.

Following the pre-ontology tagging step 305, the module 300 processes the training data set 201 to identify context vectors 306. Context vectors 306 are linkages between defined terms in the corpus, or data set, and the words that appear before or after each of those terms. The process begins by creating a linkage between the defined term and the words that often appear before and after each term (based on a statistical calculation). For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so-called left and right context vectors contain the predictive words for a main term, also referred to as a pivot term. Identifying context vectors 306 forms the basis for the next step, building dendrograms 307, which is building a hierarchical clustering of terms. A dendrogram, for example, may center around the term "purchase." The left context vector (preceding term) may be "want to", "need to", etc. While the right context vector (following term) may be "an i-phone", "the service", "high-speed internet."

After the development of the dendrogram 307, relations 308 are developed within the sample data set 201. As described above, relations 308 are linkages or relationships between the defined terms or between entities and terms in the corpus. For example, "cancel>account," "speak with>supervisor," and "buy>new iPhone" are exemplary relations 308. In this respect, the goal of the training algorithm 300 may be to define a concise number of strong, meaningful relations 308 according to certain predefined policies or rules. Those strong relations are given a higher score, and thus are given preference over other, lower-scoring relations.

In one embodiment, relations may be defined based on their compliance with the following rules. First, the average transcription score of the terms in the relation should be relatively high (transcription score is described in more detail hereinbelow). Second, the number of occurrences of the relation within an interaction should be high. Third, a strong relation is one that complies with the words in close proximity to it. The following example is illustrative.

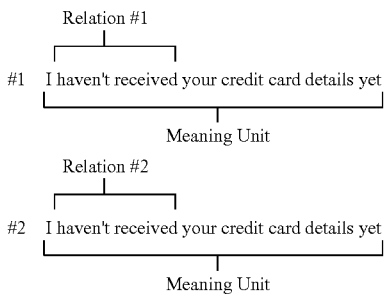

In the above example, the relation "haven't received" in #1 is a stronger relation than "have received" in #2 because it makes more sense within the context of the words in close proximity thereto (haven't received . . . yet, as opposed to have received . . . yet). Fourth, a relation is stronger if the distance between the terms is relatively small. For example, in the phrase "I want to cancel my account," the relation between cancel>account is stronger than the relation between want>account. Fifth, a strong relation has relatively lengthy terms—i.e. the total number of words in a relation is high. This is because a relation with a higher number of words is likely to convey a more precise meaning and exact context. Sixth, and finally, strong relations are those whose terms appear more often within a particular corpus or dataset.

The training algorithm 300 evaluates all possible relations, orders them by rank and defines, or designates, as relations 308 those relationships that do not contain one or more conflicts. For example, relations are not allowed to cross over one another.

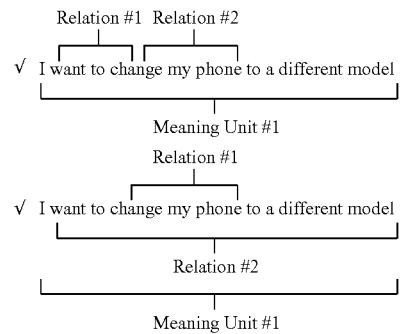

In the above example, the relation want>change and change>phone are valid relations. Even though they share the term "change", the relations themselves do not cross over each other in the meaning unit. Likewise, the terms in the relations want>different model and change>phone do not cross over each other in the meaning unit, and thus are also valid relations. In the following example, however, the potential relations want>phone and change>model do cross over each other in the same meaning unit. Therefore, this goes against the relations policy and only one of the potential relations can actually be determined and designated as a relation 308. The example below demonstrates a violation of this policy.

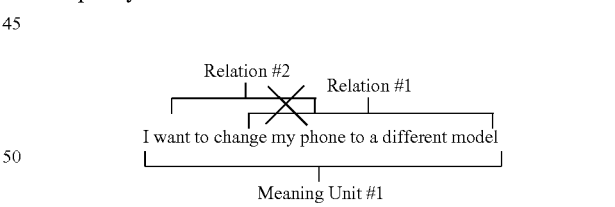

In fact, the relation want>phone does not make sense in this context, as the meaning of the sentence is about "changing" the phone. Likewise, change>model is not a strong relation, as it is unclear what "model" refers to without reading the meaning unit. Thus, neither of those relations would be defined for this meaning unit.

Similarly, a term instance in the same meaning unit cannot be assigned to multiple, different classes at the same time. In some cases, the same term in different meaning units may be assigned to more than one class—for example, phone can be assigned to two classes, depending on the context in the meaning unit (e.g. the word "phone" can be a noun or a verb: I have a "phone" vs. can I "phone" you). However, if the same term in the same meaning unit is defined and assigned to more than one class, a disambiguation process resolves the conflict. For example, the algorithm prevents the term "phone" in a single meaning unit to be assigned to a device and an action class simultaneously.

Likewise, in the embodiment of FIG. 3, a particular instance of a word cannot be assigned to more than one term. For example, the word "phone" in the example below cannot be assigned to more than one term.

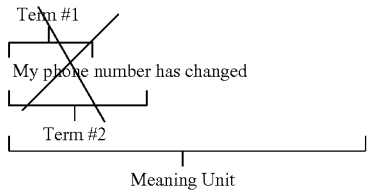

In the above example, there are two potential terms: "my phone" and "my phone number". However, because the words in these terms overlap in the text, they cannot be defined as two separate terms. In this case, the term that is defined is "my phone number" because it is longer in length than "my phone."

Based upon the relations 308, the system identifies, or surfaces, themes 309 are existing within the dataset. Themes 309 are groups or categories of relations that are similar in meaning. Themes 309 allow users to easily and efficiently understand the characteristics of interactions throughout the corpus. For example, the theme "got an email" might correspond to several relations, including "got the email," "got confirmation," "received an email," "received an email confirmation," etc.

Upon completion of the theme identification 309, the training process may be completed 310 and the training module may output an ontological structure 360, such as the initial ontology 110 referred to in the discussion of FIG. 1. In the context of FIG. 1, the initial ontology 110 created by the module 300 may then be fed to an ontology administration module 2 wherein it would undergo further refinement.

FIG. 4 is provides a schematic diagram of another exemplary process to develop an ontology based on a training set of communication data. For ease of description and conception, the depicted ontology development process 20 can be divided into three exemplary phases 22, 24, and 26. However, such division is not intended to be a limiting of the embodiment or the invention.

The processing at 22 begins with a data base of raw data which may include any communication data, such as transcriptions of customer service interactions, and other information files such as customer service agent scripts, service manuals, product manuals, or the like. During the transcription process, the transcription server may use a language model to transcribe the text in an interaction. In one embodiment of a transcription process, the text is divided into timeslots, such as intervals measured in milliseconds, to segment the utterances (consecutive streams of sounds and words from the same speaker). For example, the timeslots may be defined or divided based on location of silences or other indicators of divisions between words or utterances. For each timeslot, the transcription engine provides one or more suggestions for each transcribed word, and assigns a transcription score for each suggestion. The transcription score may be derived based on two guiding principles. First, the transcription engine's confidence in the word is determined by the confidences, or likelihoods, of its neighboring words (words that come before and after the word). This is calculated by a series of probability tables. Second, an engine's confidence in the word is determined by how close the word comes to the original vocal sound (or the word's source). If the engine surfaces more than one likely candidate for a word, the engine may produce a list of candidate words and sort them based on their transcription score—e.g., from highest to lowest.

The corpus, or set of communication data, provided at 28 is filtered by a rank filter at 30 which may be used to create a filtered corpus 32 which has been identified through the rank filter at 30 to be related or instructive to the domain of the ontology that is to be developed, such as customer service interactions. In a non-limiting embodiment, the rank filter includes a statistical analysis of the terms that appear in the corpus of data stored at 28 and the filter selects those data files that include a specific threshold of identified related terms or statistically significant terms.

The filtered corpus, or communication data files, at 32 are used to identify scripts at 34. As discussed above, scripts are sequences of a predefined number of words that commonly or repeatedly occur in the filtered data. In a non-limiting example, scripts are identified at 34 by dividing the filtered data into utterances which are consecutive sequences of sounds or words spoken by one speaker in a conversation without interference from another speaker or any event. In the exemplary customer service application, utterances may result from a customer service agent or from the use of an interactive voice response (IVR). Scripts can be identified by sequences of text that follow a predetermined script identification rule. A non-limiting example of a rule to identify an agent script can exemplarily be a sequence of more than x (where x is a parameter) number of words occurring more than y (where y is a parameter) times per million utterances in the filtered files where some range of tolerance for missing or additional words in the sequence is provided. A non-limiting example of a rule to identify an IVR script may be a sequence of more than x (where x is a parameter) words that is characterized by the constant distribution of word length and distances between particular words in the sequence.

In addition to the identification of scripts 34 from the filtered data, other templates may be identified. These templates may be the identification of abbreviations and the associated meaning of such abbreviations, or the identification of micropatterns in the filtered data. Micropatterns are similar to scripts, but are typically shorter. In the customer service application, micropatterns may occur in the utterances of either an agent or a customer where the micropattern expresses sub-sequences of words that indicate the existence of other information in close proximity to a micropattern in the customer service interaction. Non-limiting examples of micropatterns may be sequences of numbers, such as may indicate a date, a price, a telephone number, or a credit card number. In the context of analytics, often the actual number itself carries less contextual meaning than the identification of what that number represents. Microscripts can therefore reduce the complexity of text to be analyzed by replacing number strings with an identification of what that string identifies. Non-limiting examples of these may include that a telephone number is 10 numerical digits typically expressed in a three-three-four pattern while a credit card number is a 16 digit number that is often expressed in a four-four-four-four number pattern.

Identified scripts, abbreviations, and/or micropatterns may all be stored at 36 for use in the processes as described herein. The scripts, abbreviations and/or micropatterns stored at 36 may also come from other data processing sources, and script maintenance processes 38 where the information stored at 36 is updated to reflect emerging issues, topics, or trends. The script maintenance at 38 may be an automated, semi-automated, or manual process that may involve the review and/or input from a user 40 to evaluate the data stored at 36.

The scripts, abbreviations, and/or micropatterns stored at 36 are also used to process at 42 each of the files from the filtered data 32. The processing at 42 may include, but is not limited to, script tagging, zoning, and/or indexing. Each of these techniques represent manners in which a data file can be preprocessed to provide additional information regarding the data files for use in facilitating further aspects of the process as described herein.

As a result of the processing at 42, features in the data files such as utterances, meaning units, call segments, categories, and dialog acts may be identified within the data files to create tagged communication data which is stored at 44. In examples as disclosed herein, utterances are consecutive sequences of words spoken by one speaker in a conversation without interference by another speaker or another event. As discussed above, meaning units divide scripts or utterances into a basic segments of meaning or the equivalent of a sentence, when narrated text is compared to written text. A call segment is a set of utterances within a call, usually consecutive utterances, that are related to a specific topic. Non-limiting examples of call segments may include, call beginning, customer detail verification, call reason, problem description, problem resolution, and call finalization. A dialog act is related to a call segment in that the dialog act indicates some intention of the speaker or denotes a function or purpose of an utterance or meeting unit within the customer service interaction. Non-limiting examples of dialog acts may include identification whether an utterance/meaning unit is a statement, question, greeting, or such. In some embodiments, a category or a user defined labeled predicate is assigned to the data file exemplarily by the customer service agent to identify a domain of the customer service interaction. In an alternative embodiment, the category may be determined through the application of rules that are expressed as a query language using logical operators on variables (text) extracted from the call.

After the phase 1 at 22 has been completed, the process continues with term phase 2 at 24, which involves term identification or extraction. In phase 2 at 24, the individual terms, such as described above, are identified or broken out at 46 from the customer service interactions stored at 44. As noted above, the terms are basic units of the call data which represent a single concept. The identified terms are stored at 48. It is to be noted that in some embodiments of term identification or extraction 24, other sources 50 of communication data, such as customer service interactions, may be introduced to the process at this time for ontology development.

The final phase of the process is phase 3 at 26 where an ontology is generated. In phase 3, context understanding occurs wherein context vectors 52 and extraction patterns 54 are developed and applied to both the extracted terms 48 and to the processed customer service interactions at 44. As described with respect to the embodiment of FIG. 3, context vectors may be created via rules or algorithms that are applied to an extracted term 48 and provide a tool that allows grouping of similar or related terms which can exemplarily be identified or grouped as synonyms, equivalents, or as classes in the ontology. Context vectors can also be applied in order to disambiguate a term meaning according to the local context in which the term is used in the customer service interaction. Context vectors may be created as part of a pre-processing stage, exemplarily, during the phase 1 at 22 and/or used in the ontology generation at 26. Inputs may be considered in the generation of context vectors, including statistics of the extracted terms in the corpus or a subset of the corpus (such as a single customer service interaction) and the identified meaning units from the corpus or subset thereof.

Further, in a non-limiting embodiment, a context vector may be created by first computing how many times each term appears in the extracted terms 48 as well as in the tagged communication data 44. Next, the number of times each pair of terms appear adjacent to a term in a corpus, or subset thereof, may also be computed. For each term, a context vector or a list that predicts terms that will appear to the left and to the right of the term is created. In some embodiments, each term may have two associated context vectors (a left or preceding vector and a right or following vector). In order to create the two vectors, a score is calculated that is representative of the likelihood that a specific term will appear (exemplarily to the left) of the term being investigated. In one embodiment, the score is calculated as $P(T-(i)) \div \text{average\_distance}(T, t(i))$. The potential terms are sorted based upon their calculated predictive score and a predetermined number of terms taken in descending order by predictive score are selected to be a context vector for that term.

In one exemplary algorithm for determining context vectors 52, the size of a context vector may be capped. In a non-limiting example, the size of a context vector may have a maximum of 30 terms. Further, when an investigation is made for term pairs that appear adjacent to the term within a meaning unit, the system may require that the term pairs must appear within a predetermined distance, e.g. 10 words, of one another. As an example, the distance may be calculated between the nearest points between the two terms. In application of the context vector, a score may be created by first disregarding term pairs that do not occur a predetermined minimum threshold of occurrences, e.g. three occurrences. Next, instances of term pairs in which the candidate term does not have a predetermined minimum number of appearances, e.g. 10 appearances, may be disregarded. Instances of term pairs with the ratio between the number of instances of the candidate pair and the total number of instances for that term is above a predetermined threshold (e.g. 10,000 or more) may also be disregarded. The context vector score may then be calculated from the remaining identified term pairs.

In the extraction of patterns at 54, a pattern can be defined as a syntactic pattern within a sentence or meaning unit boundary. The pattern may be a common syntactic structure found within sentences or meaning units of the customer service interactions. The syntactic patterns may generally identify relations between identified classes of terms, i.e. classes, as the terms appear in relation to one another, and to common intervening phrases, scripts, or micropatterns. A non-limiting example of a pattern may be searching for the following sentence or meaning unit within a customer service interaction: "[Customer] would like to [action] the [object] . . . " If such a pattern is identified in an utterance, sentence, or meaning unit of a customer service interaction, then the terms that occur in the meaning unit can be identified as belonging to or being related to the identified classes in the pattern. In this way, extraction patterns also disambiguate the semantic meaning of the terms.

The identified terms, classes, and term-class relations are stored at 56 may be outputted from the system and stored as an ontology exemplarily as described above with respect to FIG. 2. Each ontology may be to be used in the automated interpretation of customer service interactions, or it may undergo further refinement before application. Referring again to FIG. 1, the stored ontologies may be initial ontologies 110 that then undergo further refinement in the ontology administration 2 stage. Alternatively, the stored ontology may be considered fully formed and ready for implementation by the customer. In that instance, the stored ontology may be employed to process and tag 3 data (see stage 3 of FIG. 1), such as live customer service data, to provide useful analytics regarding the customer service interaction.

The process of ontology maintenance and refinement 58, which is part of the ontology administration step 2, may include the presentation of the developed ontologies to a user for manual user review, input, modification or other analysis in an effort to refine, or maintain the generated ontologies at 56. In the maintenance/refinement process 58, the user is presented with the ontology in whole or in part in a graphical representation. In one embodiment, the ontology may be presented in whole or in part in a hierarchical view. In such a view, the terms may be clustered based upon similarity representing synonyms or other similar words.

The automatically-generated themes can then be refined by a user in the ontology administration stage 2 (see FIG. 1). In the ontology administration step 2, the user 60 may be presented with a similarity threshold that may be adjustable to refine the created ontology. In an alternative embodiment, the ontology is presented in a relational view. In a relational view, the patterns in the text are displayed in a columnar format with instances or examples of each pattern populating the column. Graphical links may be displayed between the instances in order to show the strength of the relationships between the words. In some embodiments, the ontology is generated by identifying repeating patterns and ranking the repeating textual patterns found in the customer service interactions based on the statistical significance of those patterns across all of the customer service interactions. These identified patterns and rankings are presented to the user 60, exemplarily in one of the manners as described above and such ontologies are viewed by the user and the user is prompted for feedback in order to improve the generated ontologies.

In another embodiment, themes can be refined in a Design Themes workspace that allows a user to view and modify themes and their associated relations surfaced automatically during the machine learning process. For instance, the user can change the constellation of themes by removing themes or specific relations, moving relations from one theme to another, creating new themes, renaming existing themes, and/or restoring previously removed themes or relations. Once the user has completed the review and modification, the updated ontology may be published. The system will then use the updated, or refined ontology 210 for tagging 3 incoming communication data. Also, as is described in more detail hereinbelow, the system may use the refined ontology 210 as an input to a training phase as previously described.

In embodiments of the Design Themes workspace, a user may be able to perform tasks, such as viewing themes and relations, searching for themes, filtering and sorting themes, modifying relations, modifying themes, and publishing updated ontologies. For example, the user may be able to display details about the themes in an ontology, including the theme state, theme name, the date it was last reviewed and/or updated, the number of relations included in the theme, and a list of the relations in that theme. The user may drill down to review detailed data about any particular aspect of a theme, including review of each relation and the terms in each relation. Further, the workspace may allow a user to prioritize the review to focus on themes that have a relatively greater impact on the ontology and/or the data set. For example, themes may be scored and sorted according to that score. The score may be based on one or more of any number of factors, including its prevalence in a data set (or within a subset of a data set, such as a single customer interaction), or its relevance to a particular search term entered by the user.

Additionally, the Design Themes workspace may provide ways of modifying themes, making suggestions for adding new themes, changing a theme's state, and creating a new theme. Additionally, signifiers may be provided for one or more themes that indicate information about a theme to a user, such as the current status and/or the state of the theme. For example, one or more themes may receive current status indicators designating that, for example, the theme is "dynamic", "locked", or "ignored". A dynamic theme is one that the system should automatically update without the need for user review or approval. Dynamic themes are likely those that pertain to interesting concepts that can help generate insights about a business and do not require the user to be involved in the exact performance measures. A locked status indicator may mean that the relations for that particular theme need to be reviewed and manually approved before they can be added to the refined ontology 201. In other words, a locked theme is one in which a user's review and approval is required before the system uses that theme to track relations. A removed, or ignored, theme is one that is not relevant for theme analysis, and is likely one that has been intentionally removed by the user. A removed theme is not included in theme analytics. The status indicators may be adjustable by a user, so that the indicator associated with any particular theme can be changed. In addition to changing the status of a theme, a user may also rename a theme, create a new theme, or merge multiple themes into a single theme.

Embodiments of the Design Themes workspace may also allow a user to display the relations associated with the selected theme, and also to accept suggestions for adding new relations to a particular theme(s), creating a new theme with selected relations, removing relations, and designating relations for further assessment or revision. The workspace may also display one or more representative snippets for each relation that display the relation in the context in which it occurred in the communication data. Additionally, the relative strength of a particular relation may be calculated and displayed, and such score may be used to prioritize the user's review process. Likewise, the system may calculate and display the number of times the relation appears in the call set, and relatively common relations may receive higher or lower scores and may be prioritized accordingly.

As mentioned above, embodiments of the Design Themes workspace may allow themes and/or relations to be designated for further assessment and/or refinement. The workspace may have a way to designate and collect such themes and/or relations so that a user can review such designations using a particular tool and may make changes that will affect how the relations are tracked and managed for future theme analysis. For example, the user may remove relations that are not accurate or do not meaningfully contribute to the ontology. Preferably, all removed relations will be saved unless they are manually erased from the system by the user. That way the user may restore a relation that was previously removed so that it may be re-included in the refined ontology. Removed relations will not be suggested again for the same theme, and the training mechanism will recognized the revision made by the user and will account for that change in subsequently developed/updated ontologies.

Relations may also be moved from one theme to another. For example, the workspace may offer a cut-and-paste tool that allows the user to remove the relation from a first theme and add it to another theme. Alternatively, the user may have the option of simply removing the relation from a particular theme and storing it on a clipboard for assessment or placement at a later time. That way the user can assess a particular theme and remove terms that do not belong without having to place those removed relations into any particular theme at that time. Thereby, the review process can be streamlined.

The refined ontology 210 can be further and continually refined by an ongoing process of ontology training 1 and ontology administration 2. A system may set a defined period in which an ontology is updated through a new ontology training 1 and/or ontology administration 2. For example, a training phase 1 may be initiated every week, month, year, etc. The new training phase may use the existing ontology as a "canned ontology" of sorts, and may use a recent training data set 201 generated in a defined recent period. For example, if a new training phase is scheduled to occur every month to update an existing ontology, then the training data set 201 would preferably include data collected during the most recent month. Thus, the training process 1 will update the existing ontology to incorporate new terms and contexts. Thereby, the ontology is automatedly updated to keep up with the changes that occur in the company, the industry, the customers, etc. The ontology administration phase 2 may be associated with every training process, or it may occur less frequently and the ontology can be continually updated without undergoing supervision through the administration step 2.

Figure 5:
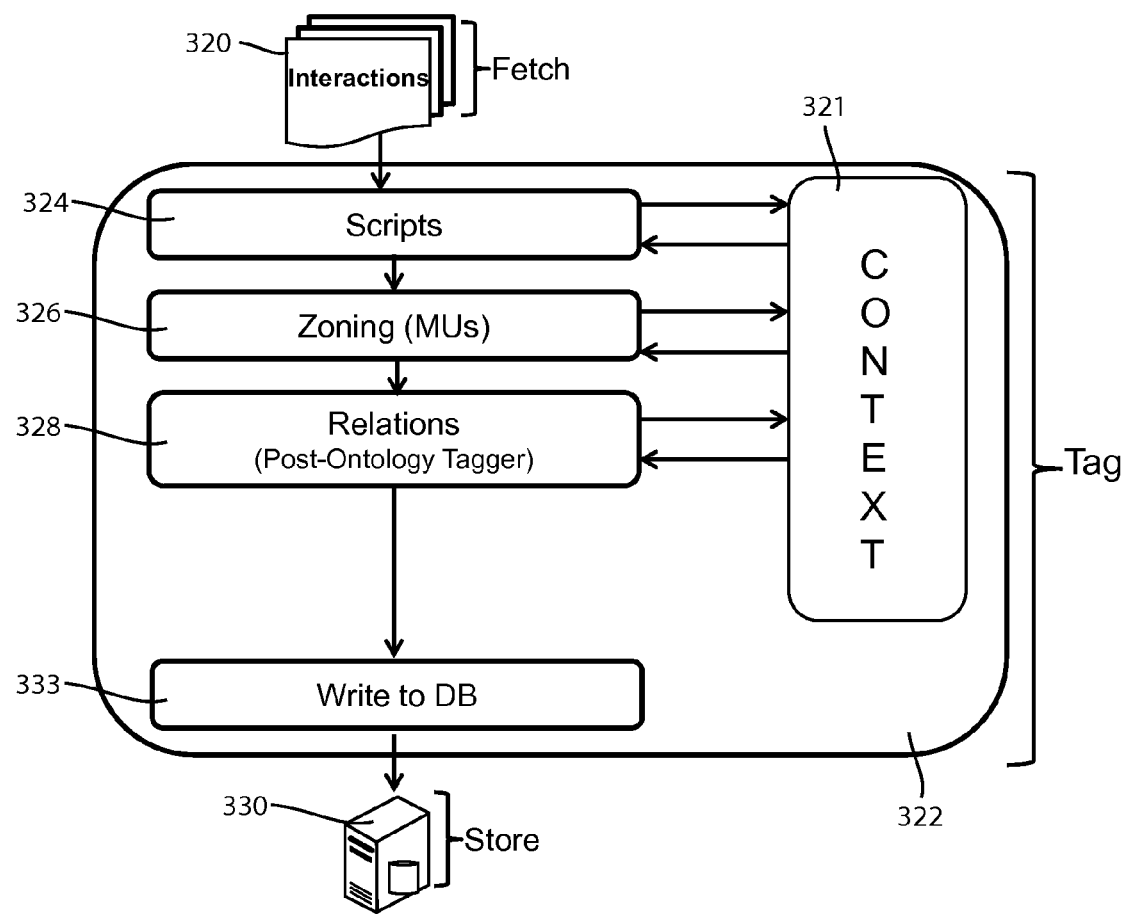
FIG. 5 is a schematic diagram of an embodiment of a process employing an ontology to tag communication data.

Once generated and refined, the ontology may be provided in the form of an output of clustered terms and term relationships. This output of clustered terms and term relationships may be utilized by any number of analytics modules or algorithms (see stages 3 and 4 of FIG. 1) in order to interpret textual transcripts of customer service interactions. The interpretation of these customer service interactions can be used to identify content or meaning of a particular customer service interaction, or may be used across many customer service interactions in order to identify topics, trends, or emerging issues. More specifically, once the ontology has been refined in the administration stage 2, the system uses the ontology in a tagging process 3 to tag meaningful elements in incoming communications data, such as transcribed interactions, and then stores the tagged data for use by the analytics module 4. First, key ontology data is loaded into the tagging system, and then the process depicted at FIG. 5 is executed wherein communications data is fetched 320, tagged 322, and stored 330. Specifically, during the loading stage, ontology and mapping tables produced during the training and administration stages, 1 and 2, are imported into the tagger's internal memory so that they may be used for tagging 3. This data includes ontology data—i.e., terms, relations, and labeled classes, structured in a hierarchical way—and related database tables—such as scripts, language models, statistics about the ontology, context vectors for each term, etc. Both types of data are used by the tagger during the pipeline process of tagging new, incoming communications data.

Once the refined ontology data has been loaded into the tagger's internal memory, the fetch/tag/store process begins. In the exemplary embodiment of FIG. 5, communication data is fetched 320 from the queue and then tagged 322 in accordance with the rules set up by the ontology data. More specifically, the tagger retrieves a communication data set, such as the next customer interaction transcript, from the queue, for example using the Post-Processing Framework (PPFW). Depending on the system configurations, the tagger can process several interactions simultaneously. The tagger then tags 322 meaningful elements in the communication data set, such as scripts 324, meaning units 326 (zoning), and relations 328 defined by the ontology. The tagged communications data is then stored 330 in a dedicated database, such as a Sybase IQ database.

In one embodiment, for each data set (or bulk of datasets, depending on the system configuration) the system tags specific elements and then saves the interaction in a temporary repository, the Context module 321. The process is then repeated for each element—scripts 324, zoning 326 (meaning unit tagging), and relations 328. After the interactions have been tagged with relations 328, the Write to Database module 333 processes the tagged interaction and sends it to the database for storing 330. As described above, the data set can include any number of types and formats of data. For example, the data set may include audio recordings, transcribed audio, email communications, text message communications, etc.

The tagged communications data can then be used to generate any number of analytics 4 (see FIG. 1). For example, the tagged communications data can be processed by a user to develop qualitative and quantitative data about the user company's customer service interactions. This may be done, for instance, via analysis of themes. As described above, themes are groups or abstracts that contain synonymous relations, and they provide users with a compressed view of the characteristics of interactions throughout the data set. As one theme represents a single concept occurring in many different calls, themes provide a summary of the calls. In this way, themes allow users to quickly and easily understand the nature of a multitude of interactions within the call set.

Figure 7:
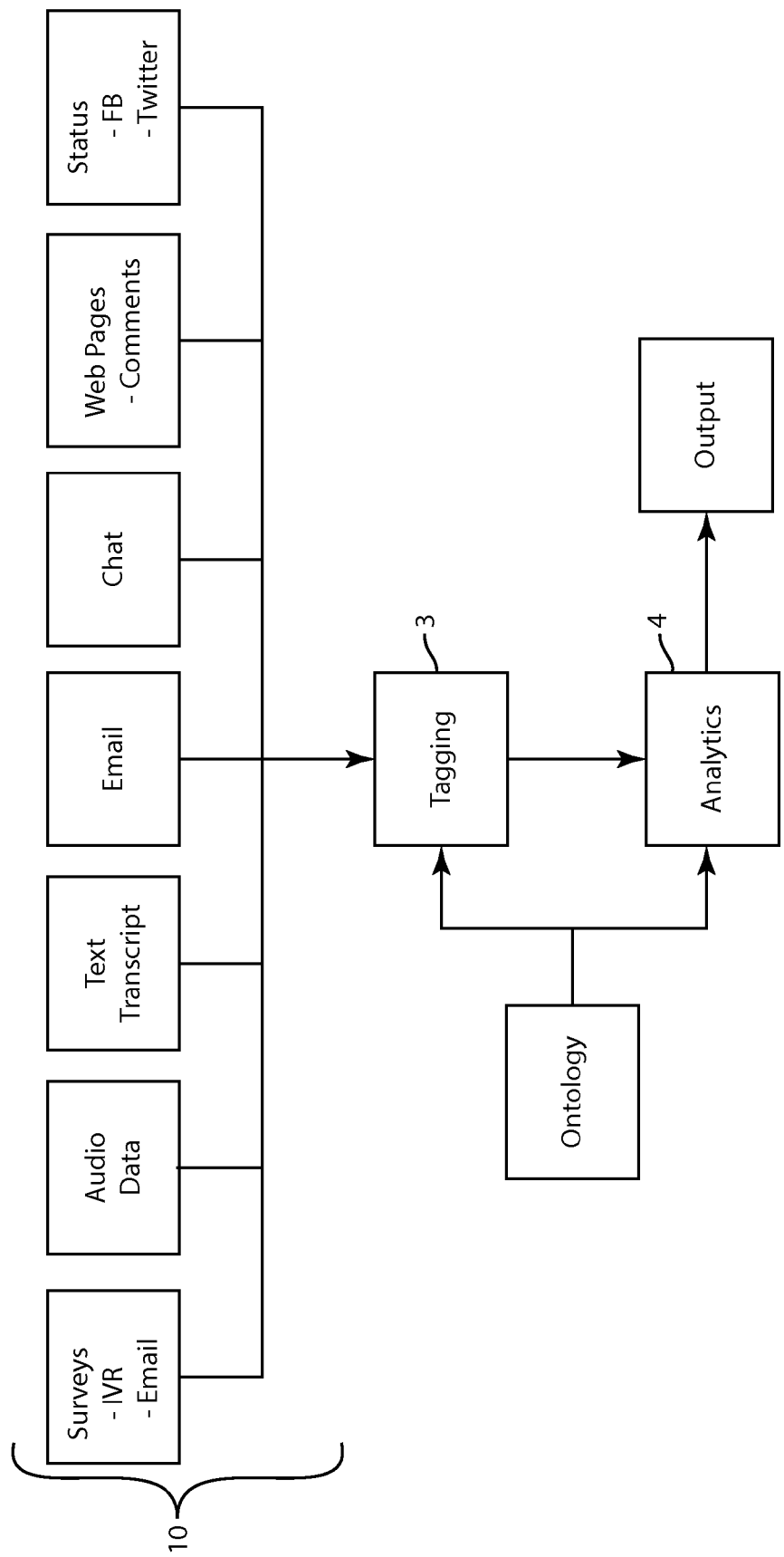
FIG. 7 is an exemplary embodiment of an ontology analytics program incorporating and analyzing multiple data platforms.

Any variety of data can be processed and tagged. FIG. 7 illustrates a flow chart demonstrating one embodiment of a communication data set 10 that can be tagged 3 and analyzed 4 using an ontology constructed according to the above-described process. As shown therein, communication data 10 may include, for example, audio data, text transcription, email, chat, web page feedback or comments, social networking interactions (such as via Facebook or Twitter), and customer surveys (e.g. taken via phone or email). For example, in a customer service application or industry, a customer service interaction, or series of interactions, may take place over multiple platforms regarding a certain issue with a particular customer. In a preferred embodiment, all such data can be incorporated and analyzed using the ontology to create a complete picture of the entire customer service system. The communication data 10 is all tagged 3 utilizing the ontology. In a preferred embodiment, the ontology is constructed according to the above described process using a sample dataset that included all types of communication data 10 that will be processed using that ontology because such training may provide a more robust ontology that can account for the linguistic norms of those particular data types. However, the invention also contemplates that a robust ontology may be applied to tag and analyze data types not used in the training of that ontology. Once a communication data set 10 is tagged and analyzed, it is stored and outputted for use and/or review by the user.

Themes can be displayed by displaying all of the relations comprising that theme and providing statistics about the appearance of such relations and/or the terms therein. For example, information about relations in a communication data set can be displayed by displaying the terms therein and connecting them with lines, wherein the strength of the connections between words is illustrated by the thickness of the line. The terms may or may not be grouped by class, so that, for example, all of the "objects" are connected with all of the "actions" that appear in a dataset. Additionally, each relationship, or connection between terms, can be described. For example, connections between employees and the customers they have served can be identified as a particular relationship. Other relationships might be identified as being related to a complaint, related to a contractual obligation (e.g. a warranty or service contract), etc.

Figure 6:
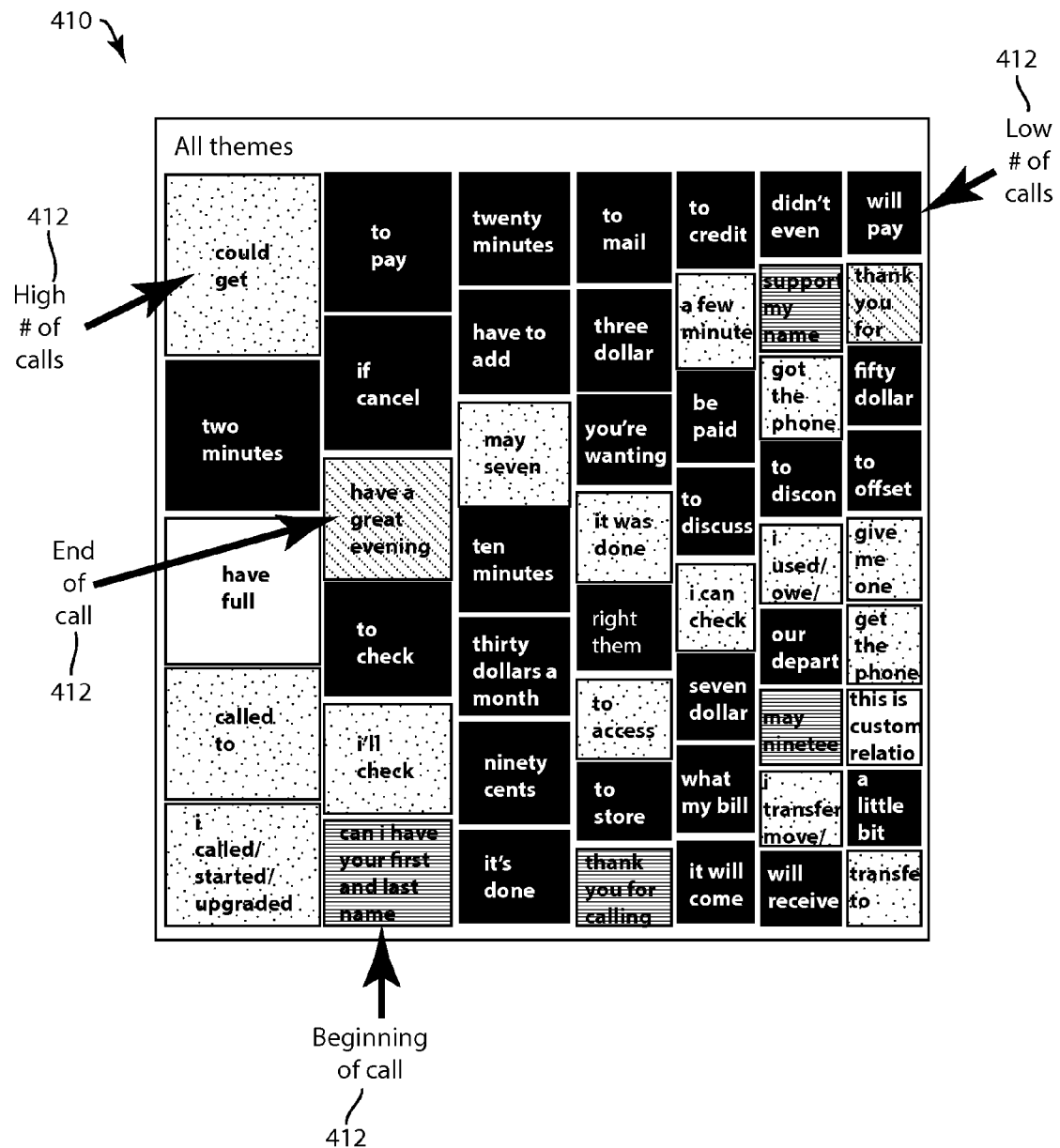
FIG. 6 is an exemplary display conveying information about a communication data set.

In one embodiment, themes can be viewed in a Theme Visualization Tree Map 410, exemplarily depicted in FIG. 6. Any number of user interface mechanisms can be employed to allow a user to interact with and display the tagged data, and the interface mechanisms can be designed to incorporate any number of data formats according to what type of data is incorporated in the communications data set. The Tree Map 410 provides users with a tool to visualize customer service call data. Using the Tree Map 410, user can select different views of the same data related to themes 326 and their associated relations 328. By selecting different performance metrics, filtering the data set to view related themes, and drilling down to view detailed information about a specific theme, the user can gain different perspectives on the data. As seen in FIG. 6, the user can use the Tree Map 410 to view theme performance about customer service call data according to certain selected metrics 412. For example, a user could select to display metrics relating to "average position in call" and "number of calls." Then the Tree Map 410 will display, for instance using an established color/size coding, themes associated with a relatively high and low number of calls in the data set and where the themes typically fall within each call. In FIG. 6, themes found in a relatively high number of calls are displayed in a relatively large cell, whereas themes that rarely appeared are displayed in relatively small cells. Color coding is used to show where the themes fell within the span of the calls in the processed data set.

In still other embodiments, the Theme Visualization Tree Map 410 (or any other display mechanism) can be employed to allow a user to view theme statistics, view and/or play snippets of a communication, or filter and chart themes or theme statistics. Useful statistics may include, for example, the total number of interactions associated with a theme or a theme's relations, the number of occurrences of the theme or the theme's relations in a call set, etc. Filtering themes would allow a user to view themes that are correlated or related to one another, or themes that contain a similar set of relations. Finally, a user could view which themes are associated with different types of interactions, such as long calls or calls with long silent periods.

Figure 8:
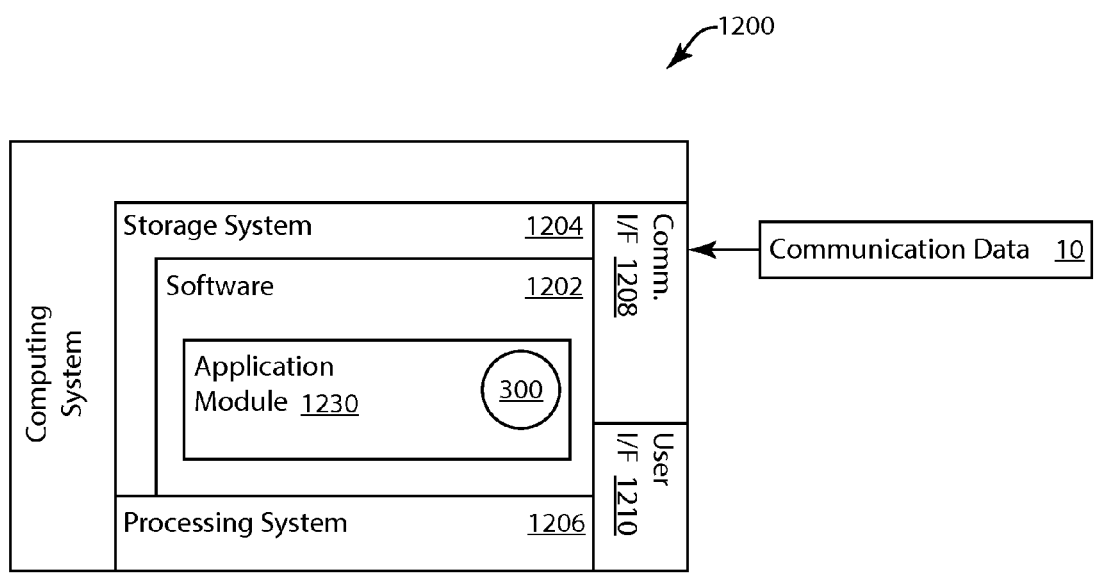
FIG. 8 is a system diagram of an exemplary embodiment of a system for developing an ontology for processing communication data.

FIG. 8 is a system diagram of an exemplary embodiment of a system 1200 for automated language model adaptation implementing an ontology training module 300. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 300.

Although the computing system 1200 as depicted in FIG. 8 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium that can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media merely a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio or video data received in real time or near-real time by the computing system 1200.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for developing an ontology via a computer system for processing communication data, wherein the ontology is a structural representation of language elements and the relationships between those language elements within a domain stored in memory of the computer system, the method comprising:
   receiving, by a training module of the computerized system, a training set of communication data, wherein the communication data is voice audio;
   transcribing, by the training module, the set of communication data into textual files;
   processing the textual files, by the training module, to identify scripts within the textual files, wherein scripts are repeated patterns that appear in the training set of communication data;
   following the identification of scripts, executing a zoning process by the training module that segments conversations within the textual files into meaning units, wherein each meaning unit is a sentence;
   after the zoning process has been completed, executing a term extraction process by the training module that evaluates the meaning units to extract terms from the textual files, wherein a term is a short word or phrase;
   after executing the zoning process, executing a pre-ontology tagging process by the training module that tags all the terms such that any given term does not span more than one meaning unit and such that any two given terms do not overlap each other;
   following the pre-ontology tagging, processing the textual files by the training module to identify context vectors, wherein the context vectors are linkages between the tagged terms in the textual files and the words that appear before or after each of those tagged terms in the textual files;
   after identifying the context vectors, building dendrograms by the training module based on the context vectors, wherein each dendrogram is a hierarchical cluster that centers around a given tagged term;
   after the development of the dendrograms, developing relations within the training set of communication data by the training module based on the dendrograms, wherein a relation is a pair of tagged terms that appear in proximity to one another in the textual files; and
   storing the tagged terms and the relations in a database as an ontology.

2. The method of claim 1 further comprising processing the tagged terms to identify classes, wherein the classes are semantic classifications of the terms, and wherein the classes are also processed in order to identify the relations.

3. The method of claim 1 wherein the step of developing the relations further includes first identifying a set of potential relations based on the dendrograms and then identifying the relations from the set of potential relations based on each potential relation's respective compliance with the following criteria:
   a number of occurrences of the potential relation within the training set of communication data is high compared to that of other potential relations;
   a number of occurrences of the tagged terms in the potential relation within the training set of communication data is high compared to that of other potential relations;
   a meaning of the tagged terms in the potential relation complies with a meaning of other terms within the same meaning unit;
   the tagged terms in the potential relation are close together compared to those of other potential relations; and
   the tagged terms in the potential relation are longer compared to those of other potential relations.

4. The method of claim 1 further including the steps of:
   reviewing the terms, relations and providing feedback to refine the terms and/or relations; and
   storing the refined terms and/or relations in the database.

5. The method of claim 1 further comprising the step of providing a canned ontology, wherein the canned ontology is a structural representation of language elements that are similar to the language elements employed in the domain, and wherein the canned ontology provides a starting point for identifying the terms and/or the relations.

6. The method of claim/wherein the canned ontology and/or the training set of communication data includes communication data in more than one spoken or written language.

7. The method of claim 1 wherein the domain is customer service for a business and the training set of communication data includes audio recordings or transcriptions of customer service calls of that business.

8. A method for developing an ontology via a computer system for processing communication data, wherein the ontology is a structural representation of language elements and the relationships between those language elements within a domain stored in memory of the computer system, the method comprising:
   creating an initial ontology by:
      receiving, by a training module of the computerized system, a training set of communication data, wherein the communication data is voice audio;
      transcribing, by the training module, the set of communication data into textual files;
      processing the textual files, by the training module, to identify scripts within the textual files, wherein scripts are repeated patterns that appear in the training set of communication data;
      following the identification of scripts, executing a zoning process by the training module that segments conversations within the textual files into meaning units, wherein each meaning unit is a sentence;
      after the zoning process has been completed, executing a term extraction process by the training module that evaluates the meaning units to extract terms from the textual files, wherein a term is a short word or phrase;

after executing the zoning process, executing a pre-ontology tagging process by the training module that tags all the terms such that any given term does not span more than one meaning unit and such that any two given terms do not overlap each other;

following the pre-ontology tagging, processing the textual files by the training module to identify context vectors, wherein the context vectors are linkages between the tagged terms in the textual files and the words that appear before or after each of those tagged terms in the textual files;

after identifying the context vectors, building dendrograms by the training module based on the context vectors, wherein each dendrogram is a hierarchical cluster that centers around a given tagged term;

after the development of the dendrograms, developing relations within the training set of communication data by the training module based on the dendrograms, wherein a relation is a pair of tatted terms that appear in proximity to one another in the textual files; and storing the tagged terms and the relations in a database as the initial ontology; providing the initial ontology to a user for review;

receiving feedback from the user to refine the initial ontology to create a refined ontology; and storing the refined ontology.

9. The method of claim 8 wherein providing feedback to refine the ontology includes amending the terms and/or the relations of the initial ontology.

10. The method of claim 8 further comprising processing the terms and the relations to identify themes within the training set of communication data, wherein a theme is a group of relations that have similar meaning; and storing the themes in the database.

11. The method of claim 10 wherein providing feedback to refine the ontology includes amending the relations associated with one or more of the themes.

12. The method of claim 8 further comprising providing the refined ontology to create a new initial ontology, wherein the refined ontology provides a starting point for identifying the terms and/or the relations of the new initial ontology.

13. The method of claim 8 wherein the domain is customer service for a business and the set of communication data includes audio recordings or transcriptions of customer service calls of the business.

\* \* \* \* \*